(12) United States Patent
Ho et al.

(10) Patent No.: US 10,817,261 B2
(45) Date of Patent: Oct. 27, 2020

(54) DATA PROCESSING APPARATUS AND METHOD THEREOF

(71) Applicant: National Taiwan Normal University, Taipei (TW)

(72) Inventors: Hong-Fa Ho, Taipei (TW); Guan-An Chen, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 452 days.

(21) Appl. No.: 15/658,284

(22) Filed: Jul. 24, 2017

(65) Prior Publication Data
US 2018/0107454 A1    Apr. 19, 2018

(30) Foreign Application Priority Data
Oct. 17, 2016  (TW) .............................. 105133430 A

(51) Int. Cl.
G06F 7/535       (2006.01)
G06F 17/18      (2006.01)

(52) U.S. Cl.
CPC .............. *G06F 7/535* (2013.01); *G06F 17/18* (2013.01); *Y02A 90/10* (2018.01)

(58) Field of Classification Search
CPC .......... G06F 7/535; G06F 17/18; Y02A 90/16
See application file for complete search history.

(56) References Cited

U.S. PATENT DOCUMENTS

| | | | | |
|---|---|---|---|---|
| 2001/0020284 A1* | 9/2001 | Tsuda | ................... | G06F 11/008 714/37 |
| 2002/0120591 A1* | 8/2002 | Keller | ..................... | G06F 17/18 705/500 |
| 2002/0170022 A1* | 11/2002 | Shirai | ..................... | H01L 22/20 702/179 |
| 2008/0172266 A1* | 7/2008 | Lin | ........................ | G06Q 10/00 705/7.11 |
| 2011/0246409 A1* | 10/2011 | Mitra | ...................... | G06F 17/18 706/52 |
| 2013/0272595 A1* | 10/2013 | Heine | .................. | A61B 5/4312 382/132 |
| 2013/0293844 A1* | 11/2013 | Gross | ................... | A61B 3/0041 351/209 |
| 2014/0003658 A1* | 1/2014 | Hein | .................. | G06K 9/00597 382/103 |

(Continued)

*Primary Examiner* — Stephanie E Bloss
(74) *Attorney, Agent, or Firm* — Sinorica, LLC

(57) ABSTRACT

A data processing apparatus, including at least: a register for storing a data set W; a processor, coupled with the register to divide the data set W into a plurality of groups according to an experimental independent variable set V, $|V|\geq 1$; use a dividing method $y^x$, where $(x,y)$ belongs to a dividing parameter set $L=\{(x,y)|$ both x and y are positive real numbers$\}$, $|L|\geq 1$, to divide each of the plurality of groups into a plurality of regions in a space of a dimension determined by an element of a data variable set Q, $|Q|\geq 1$; perform a statistical analysis with respect to an element $D_u$ of a dependent variable set D on the plurality of regions of each of the groups, where $D_u \in D$ and $|D|\geq 1$; and output a statistical result set R.

4 Claims, 6 Drawing Sheets

(56) References Cited

U.S. PATENT DOCUMENTS

| | | | | |
|---|---|---|---|---|
| 2015/0186334 A1* | 7/2015 | Weller | ............... | G06F 40/186 |
| | | | | 702/179 |
| 2015/0190050 A1* | 7/2015 | Samadani | ............ | A61B 5/7264 |
| | | | | 600/558 |
| 2017/0308594 A1* | 10/2017 | Hong | .................... | G06F 16/25 |

* cited by examiner

DATA PROCESSING APPARATUS AND METHOD THEREOF

BACKGROUND OF THE INVENTION

Field of the Invention

The present invention relates to a data processing apparatus and method, especially to a data processing apparatus and method capable of automatically using a $y^x$ dividing method to divide a data set, performing a statistical analysis on different groups of divided data, and outputting a statistical result.

Description of the Related Art

Big data analysis is an important approach for deriving useful information via analyzing huge amount of data, and the useful information can indicate the trend of climate change or disease diffusion, or help striking crimes, etc.

However, it is a heavy workload to analyze such huge amount of data, including how to divide data into groups. Taking eye-movement experiment for example, when an eye-movement experiment is finished, it is time-consuming and labor-consuming to perform a mining analysis to locate regions of interest having statistically significant differences, and does not guarantee success in locating the regions of interest having statistically significant differences for each mining analysis.

In view of this, there is a need of a novel technology in this field to automatically mine huge amount of data thoroughly with respect to each of a variety of statistical variables.

To solve the foregoing problems, a novel data processing apparatus and method is needed.

SUMMARY OF THE INVENTION

The main objective of the present invention is to disclose a data processing apparatus and method thereof, the method automatically using a $y^x$ dividing method to divide a data set, and performing a statistical analysis on different groups of divided data so as to greatly reduce cost of human labor and time needed in analyzing the data set, wherein both x and y are positive real numbers.

To attain the foregoing objectives, a data processing apparatus is proposed, including at least: a register for storing a data set W; and a processor, coupled with the register to perform a data processing method, which uses a first dividing procedure to divide the data set W into a plurality of groups, uses a second dividing procedure y to divide each of the plurality of groups into a plurality of regions in a space, performs a statistical analysis on the plurality of regions of each of the groups, and outputs a statistical result set $R_{(Du,x,y)}$, wherein the data processing method is performed based on a data variable set Q, an experimental independent variable set V, a dependent variable set D, and a dividing parameter set L={(x,y)| both x and y are positive real numbers}, $|Q|\geq 1$, $|V|\geq 1$, $|D|\geq 1$, $|L|\geq 1$ (symbol legend: the two vertical lines at two sides of a variable set represent a number of elements of the variable set), the first dividing procedure using an element belonging to the experimental independent variable set V, the dividing method $y^x$ using an element (x,y) belonging to the dividing parameter set L={(x,y)| both x and y are positive real numbers}, the space having a dimension determined by the data variable set Q, and the statistical analysis using an element $D_u$, $D_u \in D$; the data processing method including:

(1a) establishing $D_u$, $V_i$, $Q_p$, and L according to a user's settings, wherein neither of the $D_u$, $V_i$, $Q_p$, and L is an empty set, $D_u \in D$, $V_i \in V$, $Q_p \subseteq Q$, $1\leq |Q_p|\leq |Q|$, $|L|\geq 1$, and all elements (x,y) of L are elements not yet used in dividing the data set W, and presetting the statistical result set R as an empty set;

(1b) dividing W into m groups $S_j$, j=1, ..., m, according to $V_i$, where m is a positive integer number equal to a total number of variables included in $V_i$;

(1c) selecting an element (x,y) not yet used from L, letting $n=y^x$, and dividing $S_j$ uniformly into n groups, which are represented by $G_k$, k=1, ..., n and located in a space of a dimension defined by element numbers of $Q_p$;

(1d) in response to the $D_u$ of each $G_k$, k=1, ..., n, of each $S_j$, j=, ..., m, automatically performing a statistical analysis on each $G_k$, k=1, ..., n, to derive a result $R_{(Du,x,y)}$, adding $R_{(Du,x,y)}$ into R, $R_{(Du,x,y)} \in R$, and setting the current element (x,y) as used;

(1e) returning to step (1c) if there are still elements not used in L, otherwise proceeding to step (1f); and (1f) outputting the result R set.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
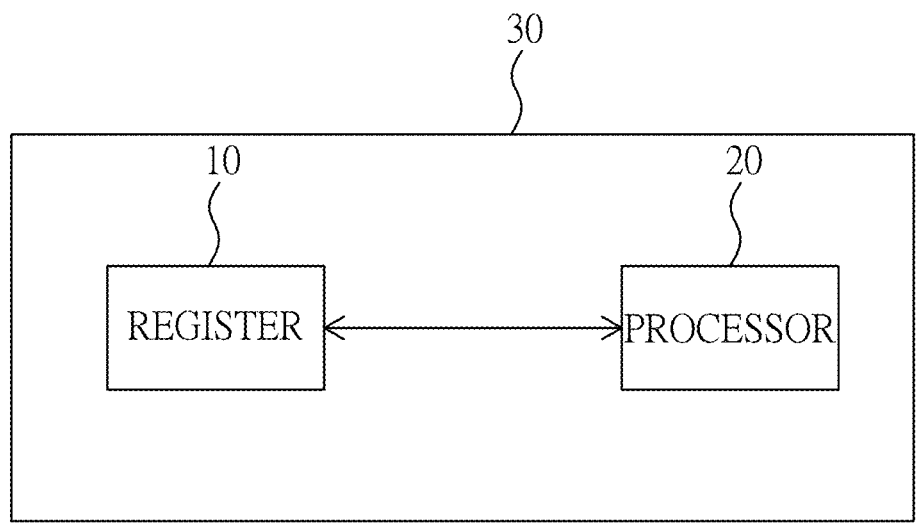
FIG. 1 illustrates a block diagram of a data processing apparatus according to one embodiment of the present invention.

Please refer to FIG. 1, which illustrates a block diagram of a data processing apparatus 30 according to one embodiment of the present invention.

As illustrated in FIG. 1, the data processing apparatus 30 includes a register 10 and a processor 20.

The register 10 is used to store a data set W of K dimensions, K being a positive integer. The data set can include data of any measured or accumulated quantity, for example, measured sound waves in different time periods, measured the eye fixation locations on a plane, measured climate data, measured rain fall data, or measured seismic data, etc. For a practical example, the data set can be (but not limited to) a sound data set (K=3) including data of variables of "sound source", "time period", and "sound amplitude", where there are two independent variables (|V|=2): "sound source" and "time period", that is, V={sound source, time period}; and there is one dependent variable (|D|=1): "sound amplitude", that is, D={sound amplitude}.

For another practical example, the data set can be an eye-movement experiment data set (K=5) including three independent variables (|V|=3): "subject person", "displayed figure" and "region of displayed figure", that is, V={subject person, displayed figure, region of displayed figure}; and there are two dependent variable (|D|=2): "eye-fixation coordinates" and "eye-fixation time period", that is, D={eye-fixation coordinates, eye-fixation time period}.

The processor 20 is coupled with the register 10 to perform a data processing method to automatically divide the data set W into a plurality of groups according to a data variable set Q, an experimental independent variable set V and a dependent variable set D, $|Q| \geq 1$, $|V| \geq 1$, $|D| \geq 1$, divide each of the plurality of groups into a plurality of regions according to a dividing method $y^x$, where (x,y) belongs to a dividing parameter set L={(x,y)| both x and y are positive real numbers}, $|L| \geq 1$; perform a statistical analysis with respect to $D_u$ on the plurality of regions of each of the groups, $D_u \in D$; and output a statistical result set $R_{(Du,x,y)}$. The statistical analysis can be t-test, ANOVA, MANOVA, or Chi-square test, etc., and the processor 20 can be a central processing unit or a microcontroller.

Figure 2:
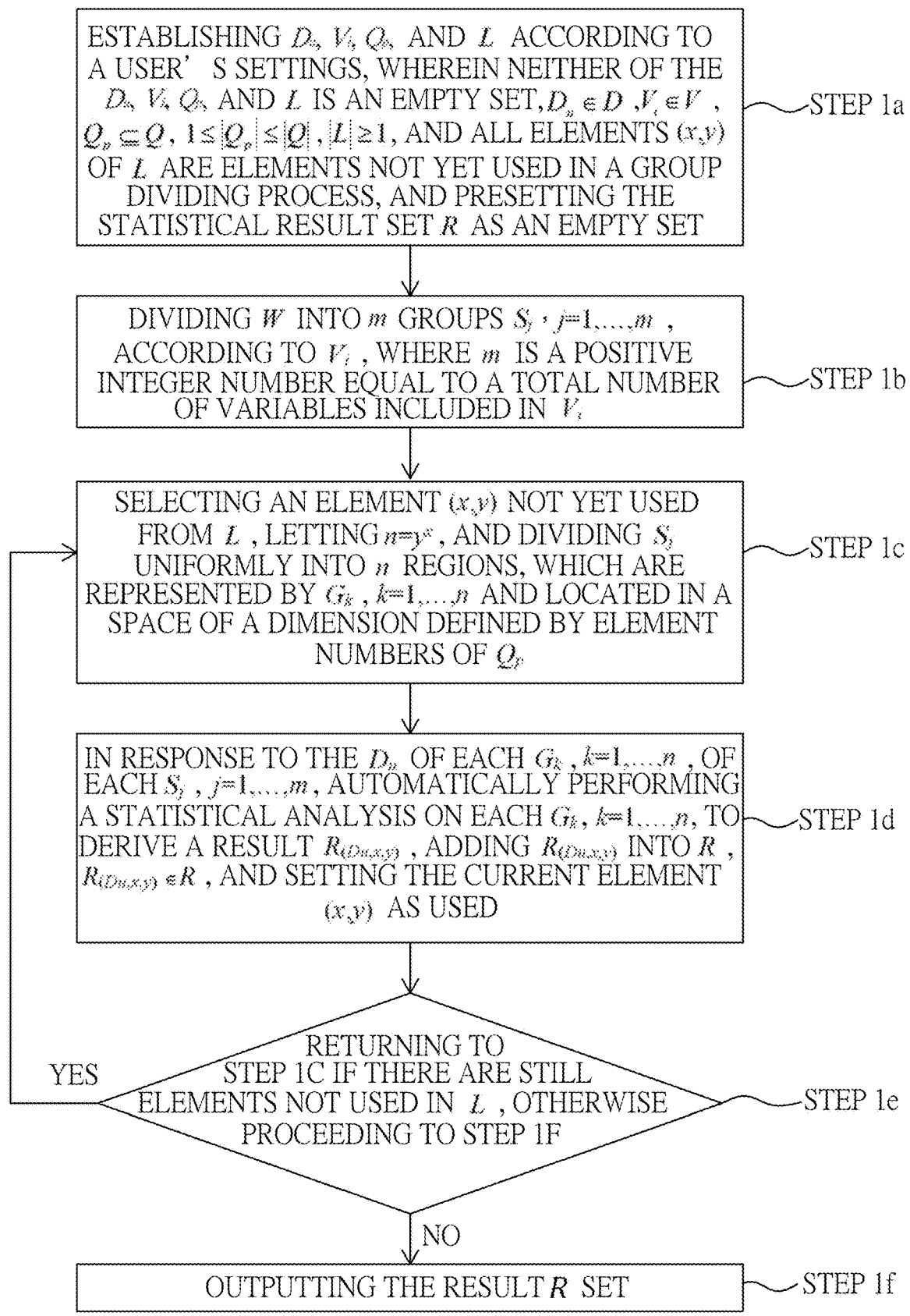
FIG. 2 illustrates a flaw chart of a data processing method according to one embodiment of the present invention.
Figure 3A:
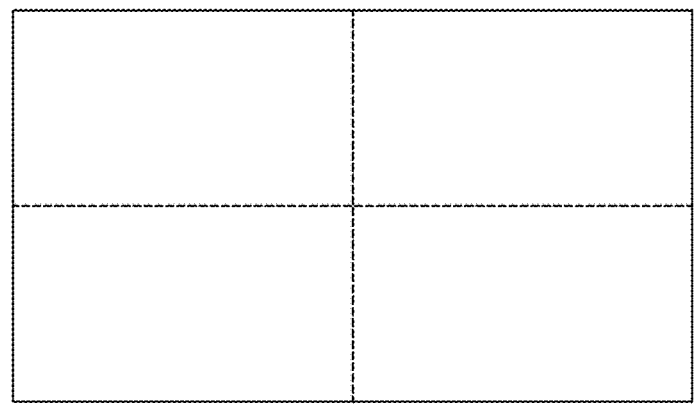
FIG. 3a-3c illustrate the data processing method of the present invention using elements of a dividing parameter set L={(1,4),(2,4),(3,4)} respectively in a dividing method $y^x$ to divide the data set into n regions, where n is equal to $y^x=4^1=4$, $y^x=4^2=16$, and $y^x=4^3=64$ respectively.
Figure 3B:
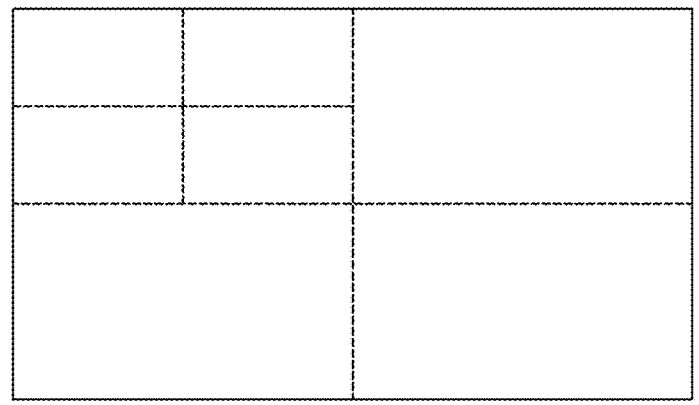
Figure 3C:
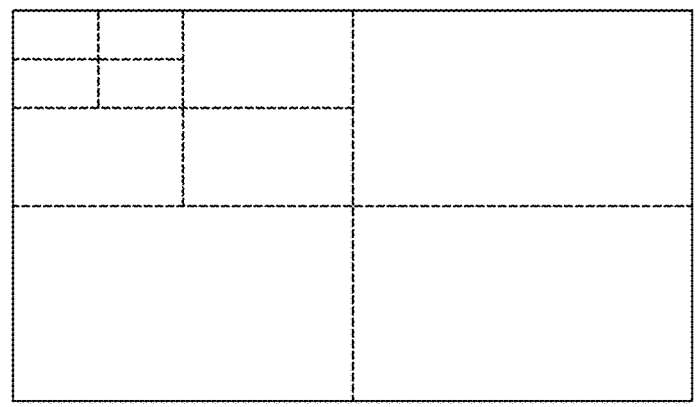

Please refer to FIG. 2-3c, wherein FIG. 2 illustrates a flaw chart of a data processing method according to one embodiment of the present invention; and FIG. 3a-3c illustrate the data processing method of the present invention using elements of a dividing parameter set L={(1,4),(2,4),(3,4)} respectively in a dividing method $y^x$ to divide the data set into n regions, where n is equal to $y^x=4^1=4$, $y^x=4^2=16$, and $y^x=4^3=64$ respectively.

The data processing method of the present invention as illustrated in FIG. 2 is performed in the data processing apparatus 30, which can be a computer, a personal computer, a notebook computer, a server, a cloud computer, a tablet computer, or an intelligent mobile phone, and the data processing apparatus 30 includes a register 10 and a processor 20. The register 10 is used for storing a data set W. The processor 20 is coupled with the register 10 to perform a data processing method on the data set W according to a data variable set Q, an experimental independent variable set V, a dependent variable set D, $|Q| \geq 1$, $|V| \geq 1$, $|D| \geq 1$, and a dividing parameter set L={(x,y)| both x and y are positive real numbers}, $|L| \geq 1$ the method including steps as follows: (step 1a) establishing $D_u$, $V_i$, $Q_p$, and L according to a user's settings, wherein neither of the $D_u$, $V_i$, $Q_p$, and L is an empty set, $D_u \in D$, $V_i \in V$, $Q_p \subseteq Q$, $1 \leq |Q_p| \leq |Q|$, $|L| \geq 1$, and all elements (x,y) of L are elements not yet used in a group dividing process, and presetting the statistical result set R as an empty set; (step 1b) dividing W into m groups $S_j$, j=1, ..., m, according to $V_i$, where m is a positive integer number equal to a total number of variables included in $V_i$; (step 1c) selecting an element (x,y) not yet used from L, letting n=$y^x$, and dividing $S_j$ uniformly into n regions, which are represented by $G_k$, k=1, ..., n and located in a space of a dimension defined by element numbers of $Q_p$; (step 1d) in response to the $D_u$ of each $G_k$, k=1, ..., n, of each $S_j'$ j=1, ..., m, automatically performing a statistical analysis on each $G_k$, k=1, ..., n, to derive a result $R_{(Du,x,y)}$, adding $R_{(Du,x,y)}$ into R, $R_{(Du,x,y)} \in R$, and setting the current element (x,y) as used; (step 1e) returning to step 1c if there are still elements not used in L, otherwise proceeding to step 1f; and (step 1f) outputting the result R set.

In step 1a, $D_u$, $V_i$, $Q_p$, and L are established according to a user's settings, wherein neither of the $D_u$, $V_i$, $Q_p$, and L is an empty set, $D_u \in D$, $V_i \in V$, $Q_p \subseteq Q$, $1 \leq |Q_p| \leq |Q|$, $|L| \geq 1$, and all elements (x,y) of L are elements not yet used in dividing a group of the data set W, and the statistical result set R is preset as an empty set. As an example, $D_u$="right answer or not", $V_i$="high or low achievement", $Q_p$={X coordinate, Y coordinate}, and L={(1,4),(2,4),(3,4)}.

In step 1b, the data set W is divided into m groups, which are represented by j=1, ..., m, according to $V_i$, where m is a positive integer number equal to a total number of variables included in $V_i$. The data set W includes K-dimensional data, where K is a positive integer. The independent variable set $V_i$, which can also be named as a variable set, provides variables for controlling an experiment, and the variables can be "gender", "residential area", "weight", "region of interest (ROI)", etc.

In step 1c, an element (x,y) not yet used is selected from L to result in n=$y^x$, and $S_j$ is uniformly divided into n regions, which are represented by $G_k$, k=1, ..., n and located in a space of a dimension defined by element numbers of $Q_p$. As an example, $Q_p$={X coordinate, Y coordinate}.

In step 1d, in response to the $D_u$ of each $G_k$, k=1, ..., n, of each $S_j'$j=1, ..., m, a statistical analysis is automatically performed on each $G_k$, k=1, ..., n, to derive a result $R_{(Du,x,y)}$, $R_{(Du,x,y)}$ is added into R, $R_{(Du,x,y)} \in R$, and the current element (x,y) is then set as used, wherein, n is a positive integer, and the dependent variable set D includes measurement variables, which can be a total contact time (TCT), a number of fixation (NOF), etc. In this embodiment, L is exemplarily illustrated as L={(1,4),(2,4),(3,4)}, and the statistical analysis can be t-test, ANOVA, MANOVA, or Chi-square test, etc.

In step 1e, check if all the dictated dividing manners are performed; if not, return to step 1c; otherwise proceed to step 1f.

As illustrated in FIG. 3a-3c, the data processing method of the present invention uses a dividing method $y^x$ to divide each divided data group into n regions, where n is equal to 4, 16, and 64 respectively. That is, with L={(1,4),(2,4),(3,4)}, when x=1, y=4, n is equal to 4; when x=2, y=4, n is equal to 16; and when x=3, y=4, n is equal to 64.

Figure 4A:
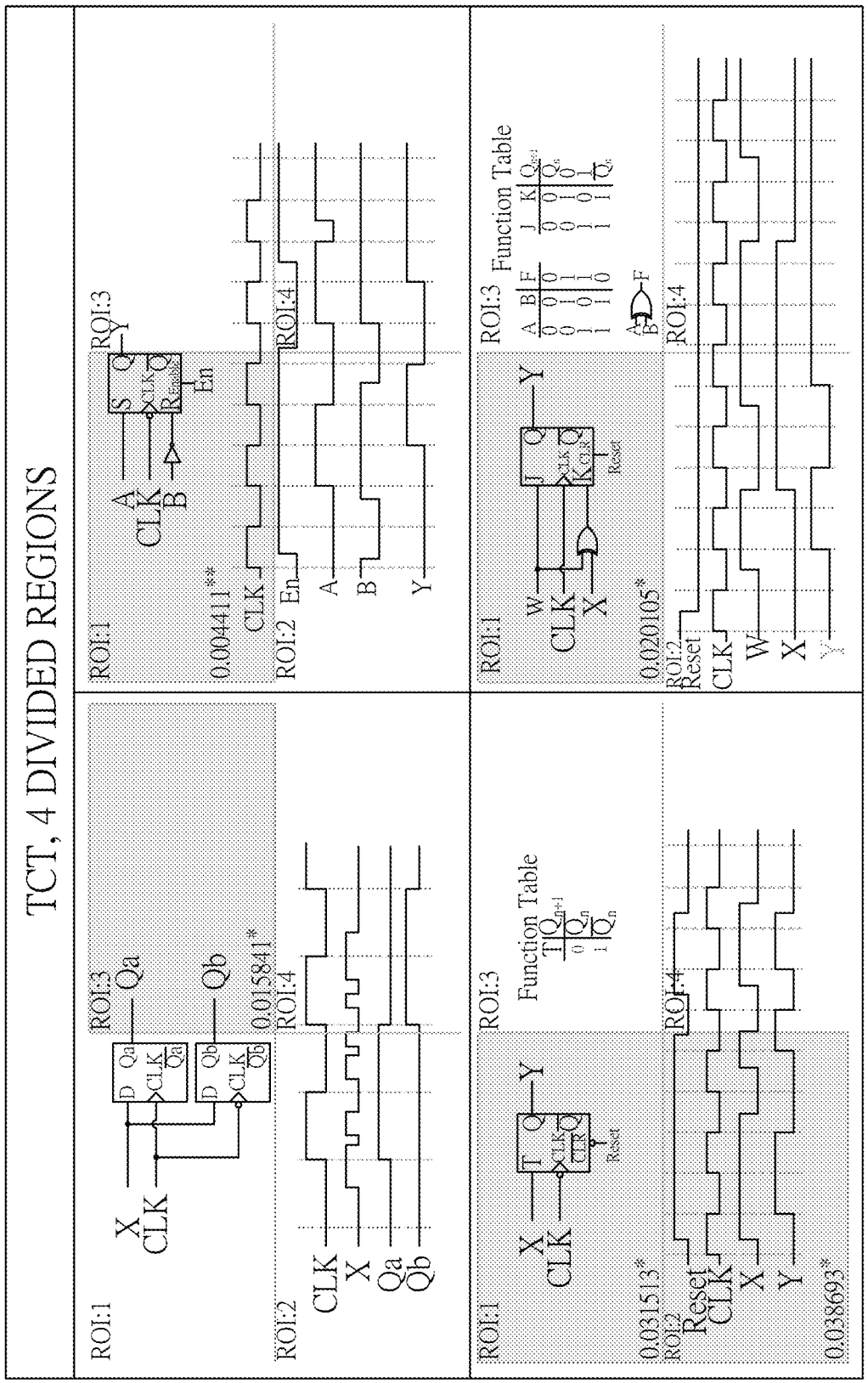
FIG. 4a-4c illustrate a scenario where the data processing method of the FIG. 3a-3c is applied to data derived from an eye-movement experiment on reading a logic circuit.
Figure 4B:
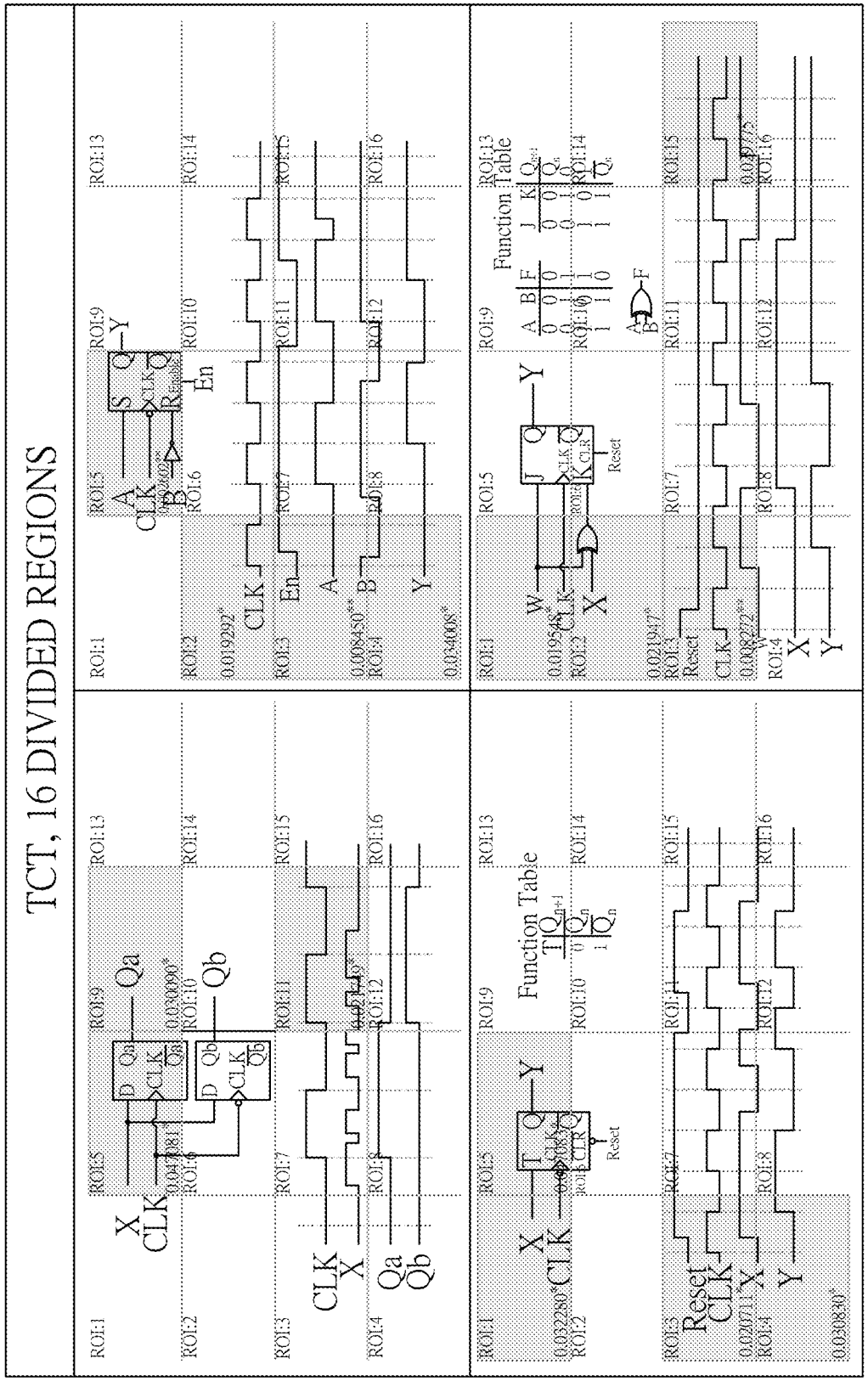
Figure 4C:
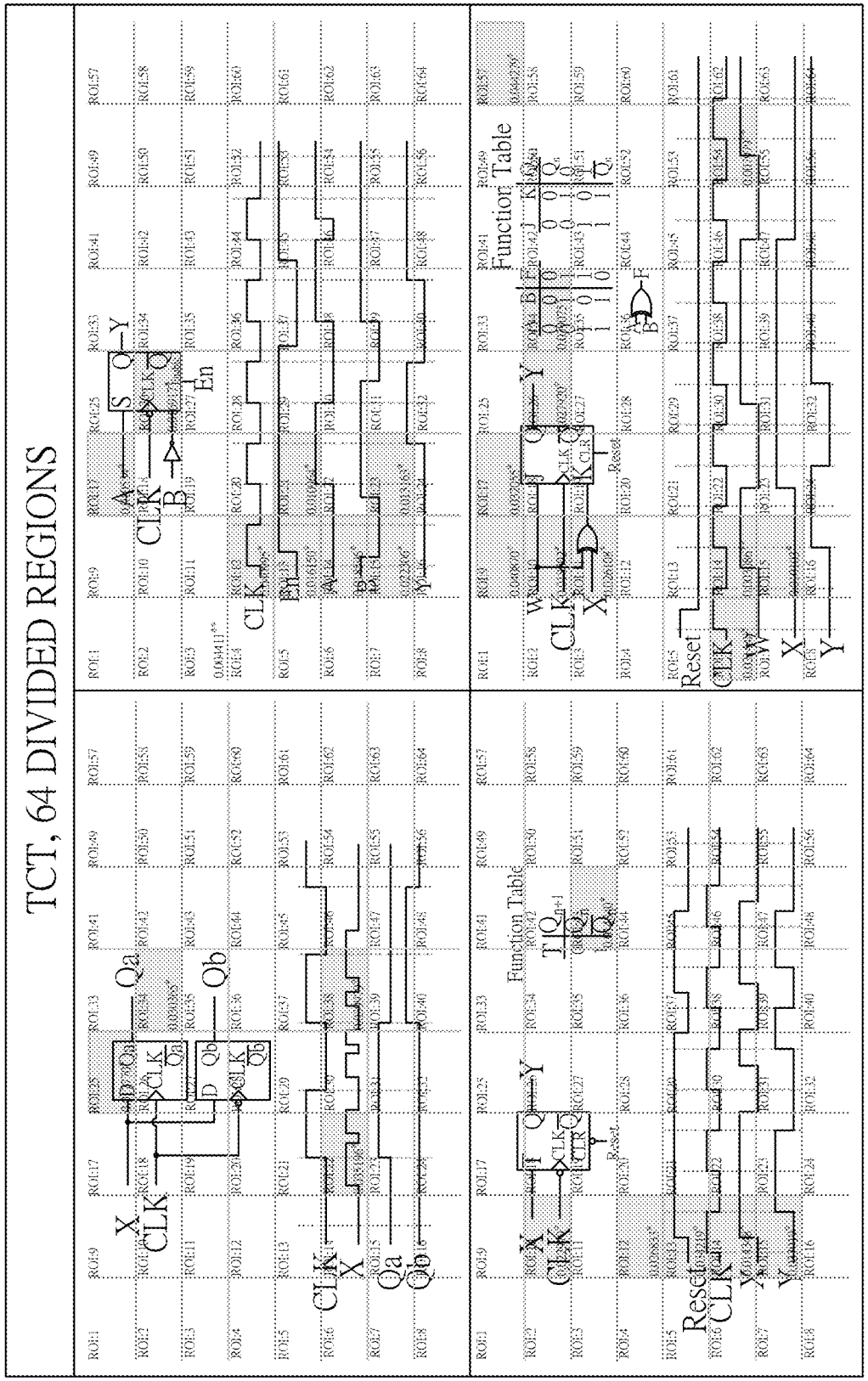

The descriptions below illustrate an example of the data processing method of the present invention acting on an eye-movement data set. As illustrated in FIG. 4a-4c, each group of the divided groups of the eye-movement data set is automatically divided by the $y^x$ dividing method into a plurality of regions and a statistical analysis is performed on each of the regions, wherein a dividing parameter set L={(1,4),(2,4),(3,4)} is used to determine the value of $y^x$ to define regions of interest. As illustrated in FIG. 4a, the data set W is divided into 4 regions of interest for a statistical analysis; as illustrated in FIG. 4b, the data set W is divided into 16 regions of interest for a statistical analysis; and as illustrated in FIG. 4c, the data set W is divided into 64 regions of interest for a statistical analysis. The data set W can be divided into 256 or 1024 regions of interest for a statistical analysis if needed.

The eye-movement experiment uses an eye tracker to track the eye movements of vocational high school students, who have taken a digital logic debugging course, when they are debugging a digital logic circuit. The experiment has 64 students from a vocational high school, and the students are divided into a low achievement group and a high achievement group according to grading results of an evaluation test held before the experiment, and each group has 32 students. Besides, the digital logic circuit includes four types of flip-flopsD type flip-flop, SR type flip-flop, T type flip-flop, and JK type flip-flop. Therefore, there are three independent variables: achievement (high grading group, low grading group), flip-flop type (D type flip-flop, SR type flip-flop, T type flip-flop, and JK type flip-flop), and truth table indication (yes, no); and three dependent variables—correctness of answer, TCT, and NOF.

The eye-movement data set is the data set W, Q={X coordinate, Y coordinate}, the independent variable set V={high or low achievement, flip-flop type, truth table indication}, |V|=3, the dependent variable set D={correctness of answer, TCT, NOF}, |D|=3.

The processing steps for the eye-movement data are as follows: (step 1a) establishing $D_u$="correctness of answer", $V_i$="high or low achievement", $Q_p$={X coordinate, Y coordinate}, L={(1,4),(2,4),(3,4)}, presetting the statistical result set R as an empty set, and attributing all elements (x,y) of L as not yet used; (step 1b) dividing the data set W derived during the logic circuit debugging processes into 2 groups, which are represented by $S_{j=1}$=high grades group, and $S_{j=2}$=low grades group, according to $V_{i=1}$="high or low achievement"; (step 1c) selecting an element (x,y)=(1,4) not yet used from L to result in $n=y^x=4$, and dividing $S_j$ uniformly into 4 regions, which are represented by $G_k$, k=1, ..., 4, with respect to $D_u$="correctness of answer"; (step 1d) automatically performing a statistical analysis on each $G_k$, ..., 4, to derive a result $R_{(correctness\ of\ answer,1,4)}$, adding $R_{(correctness\ of\ answer,1,4)}$ into R, and setting the current element (1,4) as used; (step 1e) checking if there are still elements not yet used, and (2,4) being found to be one, therefore returning to step 1c; (step 1c) selecting (x,y)=(2,4), which is not yet used, to result in $n=y^x=16$, and dividing uniformly into 16 regions, which are represented by $G_k$ k=1, ..., 16, with respect to $D_u$="correctness of answer"; (step 1d) automatically performing a statistical analysis on each $G_k$, k=1, ..., 16, to derive a result $R_{(correctness\ of\ answer,2,4)}$, adding $R_{(correctness\ of\ answer,2,4)}$ into R, and setting the current element (2,4) as used; (step 1e) checking if there are still elements not yet used, and (3,4) being found to be one, therefore returning to step 1c; (step 1c) selecting (x,y)=(3,4), which is not yet used, to result in $n=y^x=64$, and dividing $S_j$ uniformly into 64 regions, which are represented by $G_k$ k=1, ..., 64, with respect to $D_u$="correctness of answer"; (step 1d) automatically performing a statistical analysis on each $G_k$, k=1, ..., 64, to derive a result $R_{(correctness\ of\ answer,3,4)}$, adding $R_{(correctness\ of\ answer,3,4)}$ into R, and setting the current element (3,4) as used; (step 1e) checking if there are still elements not yet used, and no element found to be not yet used, therefore proceeding to step 1f; and (step 1f) outputting the result R set.

The descriptions above are for the dependent variable $D_u$="correctness of answer". However, same approach can also be applied for $D_u$="TCT" or $D_u$="NOF".

As can be seen from the data analysis result with respect to TCT($D_u$=TCT E D) shown in FIG. 4a, it indicates 4 ($n=y^x=4^1=4$) divided regions resulting from an ROI variable manipulation, wherein the right upper region ROI 1($G_{k=1}$) has two stars of statistical significance (P: 0.004411) for a t-Test, indicating that there is a significant difference between the high grades group and the low grades group in reading the logic circuit in ROI 1; in contrast, other regions only have one star of statistical significance or are even not statistically significant.

As can be seen from the data analysis result with respect to TCT shown in FIG. 4b, it indicates 16 ($n=y^x=4^2=16$) divided regions resulting from an ROI variable manipulation, which further divides each ROI region of FIG. 4a into four regions to form 16 regions, and further statistical analyses are performed on refined ROIs of the right upper ROI of two stars of statistical significance. That is, ROI 1(x=2, y=4, $G_{k=1}$) is further divided to smaller regions of ROI 1($G_{k=1}$), ROI 2($G_{k=2}$), ROI 5($G_{k=5}$), and ROI 6($G_{k=6}$), and two stars of statistical significance is still found in ROI 5 (with respect to reading a logic circuit).

As can be seen from the data analysis result with respect to TCT shown in FIG. 4c, it indicates 64 ($n=y^x=4^3=64$) divided regions resulting from an ROI variable manipulation for further refined statistical analyses.

As a result, the data processing method of the present invention can perform a statistical analysis on the eye-movement experiment data (the data set W) of 64 students to evaluate if it is statistically significant with respect to TCT at the D type flip-flop within the first square ($S_{j=1}$), and output the evaluated result to the R set; and then evaluate if it is statistically significant with respect to TCT at the D type flip-flop within the second square ($S_{j=2}$), and output the evaluated result to the R set; and then evaluate if it is statistically significant with respect to TCT at the D type flip-flop within the third square ($S_{j=3}$), and output the evaluated result to the R set; and then evaluate if it is statistically significant with respect to TCT at the D type flip-flop within the fourth square ($S_{j=4}$), and output the evaluated result to the R set. Accordingly, the present invention can automatically evaluate if there is a significant difference between the students of the high grades group and the students of the low grades group on the total contact time ($D_u$=TCT) at each of the four flip-flop circuits, and thereby provide the information for researchers in a way that greatly reduces the time spent in data processing and evaluation.

In addition, the data processing method of the present invention can also be applied to analyzing other types of data, such as climate data, rain fall data, or seismic data. For example, the present invention can help to find out the regions having a significant difference on temperature, rain fall, or earthquake between the time period of past 1-50 years and the time period of past 51-200 years based on the data of temperature, rain fall, or earthquake corresponding to past 1-50 years and past 51-200 years.

In conclusion, the present invention discloses a data processing apparatus and method thereof, the method being capable of automatically dividing each group of divided groups of a data set into a plurality of regions by way of the $y^x$ dividing method, performing a statistical analysis on the regions, and outputting the statistical results, so as to greatly reduce the data processing time and personnel workload.

In light of the specification above, the data processing apparatus and method thereof of the present invention does achieve the function of: automatically dividing a data group by way of the $y^x$ dividing method, performing a statistical analysis on the divided data, and outputting the statistical results, so as to greatly reduce the processing time and personnel workload. Therefore, the data processing apparatus and method thereof of the present invention is indeed much more advanced than those of prior art.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A data processing apparatus for receiving and processing a data set W of measured locations of eye fixation on a plane provided by a measuring device, comprising:
   a register for storing the data set W and a data variable set Q, an experimental independent variable set V, a dependent variable set D and a dividing parameter set L, the data set W including data of K dimensions, K being a positive integer;
   a processor, coupled with the register to perform a data processing method to divide the data set W into a plurality of groups according to the experimental independent variable set V, $|V| \geq 1$; use a dividing method $y^x$, where (x,y) belongs to the dividing parameter set L={(x,y)| both x and y are positive real numbers}, $|L| \geq 1$, to divide each of the plurality of groups into a plurality of regions in a space of a dimension determined by an element of the data variable set Q, $|Q| \geq 1$; perform a statistical analysis with respect to an element $D_u$ of the dependent variable set D on the plurality of regions of each of the groups, where $D_u \in D$ and $|D| \geq 1$; and output a statistical result set R;
   the data processing apparatus being configured to automatically find out ROIs (Regions of Interest) without the need to define ROIs before performing the statistical analysis with respect to Du on an output of an eye movement data of Du;
   the statistical analysis being a method selected from a group consisting of t-test, ANOVA, MANOVA, and Chi-square test; and
   the processor being a central processing unit or a micro controller.

2. A data processing method implemented in an electronic apparatus, the electronic apparatus being used to receive a data set W of measured locations of eye fixation on a plane provided by a measuring device and perform the data processing method to process the data set W, the data set W including data of K dimensions, K being a positive integer, the electronic apparatus including a register and a processor, the register being used for storing the data set W, the processor being coupled with the register to execute a program to perform the data processing method, the register also storing a data variable set Q, an experimental independent variable set V and a dependent variable set D, $|Q| \geq 1$, $|V| \geq 1$, $|D| \geq 1$, and a dividing parameter set L={(x,y)| both x and y are positive real numbers}, $|L| \geq 1$; the method including the steps of:
   (1a) establishing $D_u$, $V_i$, $Q_p$, and L according to a user's settings, wherein neither of the $D_u$, $V_i$, $Q_p$, and L is an empty set, $D_u \in D$, $V_i \in V$, $Q_p \subseteq Q$, $1 \leq |Q_p| \leq |Q|$, $|L| \geq 1$, and all elements (x,y) of L are elements not yet used in dividing the data set W, and presetting the statistical result set R as an empty set;
   (1b) dividing W into m groups $S_j$, j=1, ..., m, according to $V_i$, where m is a positive integer number equal to a total number of variables included in $V_i$;
   (1c) selecting an element (x,y) not yet used from L, letting $n=y^x$, and dividing $S_j$ uniformly into n regions, which are represented by $G_k$, k=1, ..., n and located in a space of a dimension defined by element numbers of $Q_p$;
   (1d) automatically performing a statistical analysis on each $G_k$, k=1, ..., n, to derive a result $R_{(Du,x,y)}$, adding $R_{(Du,x,y)}$ into R, $R_{(Du,x,y)} \in R$, and setting the current element (x,y) as used;
   (1e) returning to step (1c) if there are still elements not used in L, otherwise proceeding to step (1f);
   (1f) outputting the result R set; and
   automatically finding out ROIs (Regions of Interest) without the need to define ROIs before performing the statistical analysis with respect to Du on an output of an eye movement data of Du.

3. The data processing method as disclosed in claim 2, wherein the statistical analysis is a method selected from a group consisting of t-test, ANOVA, MANOVA, and Chi-square test.

4. The data processing method as disclosed in claim 2, wherein the electronic apparatus is an apparatus selected from a group consisting of a computer, a personal computer, a notebook computer, a server, a cloud computer, a tablet computer, and an intelligent mobile phone.

* * * * *